UNITED STATES PATENT OFFICE.

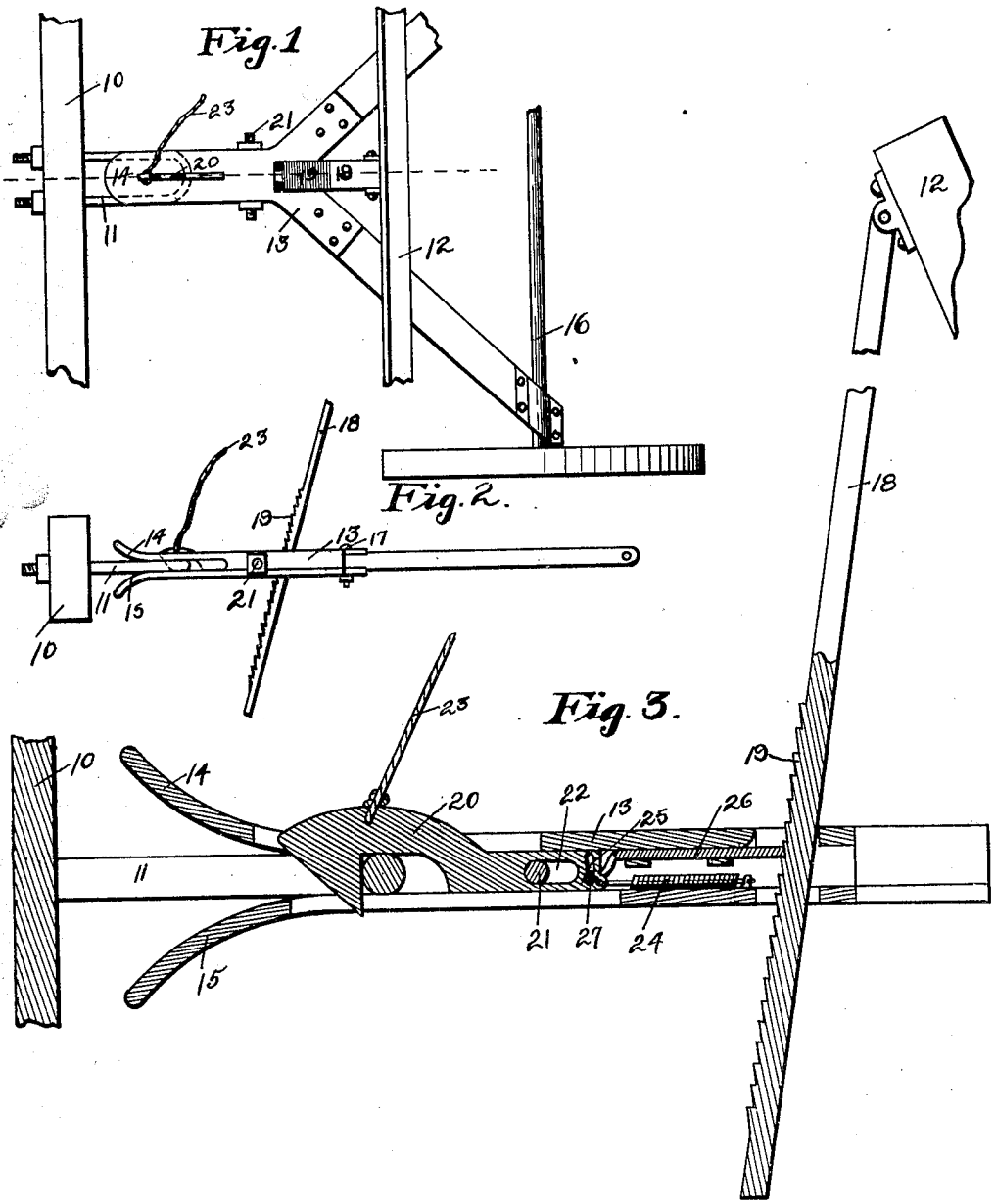

FRED H. MINNICH, OF DEDHAM, IOWA.

COUPLING FOR HAY RAKES AND LOADERS.

No. 926,349.　　　　　Specification of Letters Patent.　　　Patented June 29, 1909.

Application filed September 5, 1908. Serial No. 451,850.

*To all whom it may concern:*

Be it known that I, FRED H. MINNICH, a citizen of the United States, residing at Dedham, in the county of Carroll and State of Iowa, have invented a certain new and useful Coupler for Hay Rakes and Loaders, of which the following is a specification.

In connection with the use of hay rakes and loaders of the class that deliver hay to a vehicle to which the hay rake and loader is attached, it is frequently necessary to couple and uncouple the hay rake and loader from the various wagons that are used in connection with it. This ordinarily necessitates the driver of the wagon descending from the wagon and leaving his team while connecting the coupling device. In many instances this is dangerous and it always requires considerable time and work. Furthermore, the surface of the ground on which machines of this kind are usually operated is uneven and irregular and hence the forward end of the coupler seldom stands at the same distance from the ground with relation to the coupler member carried by the various wagons, and hence, it is necessary, even if an automatic coupler is provided to also provide some means whereby the coupler member on the hay rake and loader is automatically supported and held at the same distance from the ground each time that it is uncoupled from a wagon.

My object is to provide a coupler of simple, durable and inexpensive construction, especially designed for use in connection with implements of the class described, and so arranged that when the wagon is stopped, the coupler will be automatically held and locked at the same point of elevation above the ground in which it stood when the wagon was stopped, so that when uncoupled from the wagon it will be at the proper point of elevation above the ground to receive the coupling device of another wagon.

My invention consists in the construction, arrangement and combination of the various parts of the device, whereby the objects contemplated are attained as hereinafter more fully set forth, pointed out in my claim, and illustrated in the accompanying drawings, in which—

Figure 1 shows a top or plan view of a coupling device embodying my invention and showing portions of a wagon and hay rake and loader to which the coupling device is attached. Fig. 2 shows a side elevation of same, and—Fig. 3 shows an enlarged, detail, sectional view taken on the line shown through the central portion of Fig. 1.

Referring to the accompanying drawings, I have used the reference numeral 10 to indicate that portion of the wagon shown. The wagon has attached to it a coupling member consisting of a U-shaped rod 11 fixed to the wagon. In this connection it is to be understood that all of the wagons that are to be used with the hay rake and loader are provided with similar coupling members arranged at the same height from the ground.

The portion of the hay rake and loader shown as indicated by the reference numeral 12. The coupler draw-bar comprises a body portion 13 having the forward portion of the draw-head flared outwardly at its top and bottom, as indicated at 14 and 15 in Fig. 3, thus leaving a space within the draw-head to receive the coupling rod 11, said flared portions of the draw-head being designed to draw the coupling rod 13 into the interior of the draw-head. The rear end of the draw-head is preferably provided with two branches which branches are connected to the front end of the hay rake and loader which is pivoted to the axle 16 thereof in such a manner that said front end may freely swing up and down. The said draw-bar is also connected at its rear end with the hay rake and loader frame by means of a pin 17.

Pivoted to an elevated portion of the hay rake and loader frame 12 is a bar 18 extended downwardly and forwardly and provided with ratchet teeth 19 at its forward edge. This bar extends through an opening formed in the rear portion of the draw-bar and the said draw-bar may freely swing vertically relative to the ratchet bar. Pivoted within the draw-bar is a coupling hook 20 pivoted to the bolt 21 which passes through a slot 22 in the hook. Said hook has its forward end arranged to engage and enter the U-shaped coupling bar 11, as clearly shown in Fig. 3. Attached to the hook is a rope or cable 23 by which the forward end of the hook may be elevated. The said hook is normally held at its rearward limit of movement within the draw-bar by means of a spring 24 attached to the hook and to the draw-bar.

In the rear end of the hook 20 is a slot 25 and slidingly mounted within the draw-bar, near its rear end, is a bolt 26 which bolt is designed to engage the ratchet teeth 19. The forward end of the bolt is provided with an extension 27 inserted in the slot 25, and said parts are so arranged that when the hook 20 is held at its rearward limit by the spring 24, the slide-bolt 26 will firmly engage the ratchet teeth 19, and when the hook 20 is moved forwardly against the pressure of the spring 24, the bolt 26 will be withdrawn from the ratchet bar. By having the bolt 26 inserted in the slot 25 it is obvious that the hook 20 may be raised and lowered far enough to couple or uncouple and the position of the bolt 26 will not be changed thereby.

In practical use and assuming that the hay rake and loader is standing in a field, it is obvious that the spring 24 will hold the bolt 26 in position in engagement with the ratchet teeth, and therefore, the draw-bar will be firmly held against downward movement. Then when it is desired to couple a wagon to it, the driver backs the wagon to position where the coupling member 11 will enter the draw-bar, whereupon the hook 20 will engage the coupling member 11. When the wagon is pulled forwardly the hook 20 will be moved forwardly as far as it will be permitted to go by the bolt 21 in the slot 22. This will release the bolt 26 from the ratchet bar and, hence, the entire draw-bar will be free to swing both up and down. As soon as the wagon is stopped, then the spring 24 draws the hook 20 rearwardly and throws the bolt 26 into engagement with the ratchet bar, so that if the hook 20 is uncoupled, the ratchet bar will be held in the same position as it was when the wagon stopped.

I claim as my invention—

In a device of the class described, the combination of a draw bar, a coupling member designed to be inserted in said draw bar, a coupling hook pivotally and slidingly mounted in the draw bar, a rope attached to the coupling hook for elevating it to position out of engagement with said coupling member, a spring for yieldingly holding the coupling hook to its rearward limit of movement, said coupling hook being provided with a slot at its rear end, a slide bolt mounted in the draw bar and having an arm inserted in said slot so that the slide bar will move forwardly and rearwardly with the coupling hook, and also so that the coupling hook may be raised and lowered without moving the slide bar, and a notched bar pivotally supported above the draw bar and extended downwardly through it to a position where the said slide bolt may engage with the notches thereof.

Des Moines, Iowa, Aug. 22, 1908.

FRED H. MINNICH.

Witnesses:
C. C. BOWIE,
FRED A. TOOVEY.